United States Patent
Miyasaka

(10) Patent No.: US 9,484,783 B2
(45) Date of Patent: Nov. 1, 2016

(54) OUTER ROTOR TYPE MOTOR

(75) Inventor: Takeshi Miyasaka, Ueda (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 385 days.

(21) Appl. No.: 14/342,310

(22) PCT Filed: Sep. 10, 2012

(86) PCT No.: PCT/JP2012/073036
§ 371 (c)(1),
(2), (4) Date: Feb. 28, 2014

(87) PCT Pub. No.: WO2013/058032
PCT Pub. Date: Apr. 25, 2013

(65) Prior Publication Data
US 2014/0225463 A1     Aug. 14, 2014

(30) Foreign Application Priority Data
Oct. 17, 2011 (JP) ................................ 2011-228085

(51) Int. Cl.
*H02K 3/50* (2006.01)
*H02K 1/12* (2006.01)
(Continued)

(52) U.S. Cl.
CPC ............... *H02K 3/50* (2013.01); *H02K 1/145* (2013.01); *H02K 3/46* (2013.01); *H02K 3/525* (2013.01); *H02K 5/225* (2013.01); *H02K 9/00* (2013.01); *H02K 37/10* (2013.01)

(58) Field of Classification Search
CPC ........ H02K 3/50; H02K 1/145; H02K 5/225; H02K 37/00–37/24
USPC ......................... 310/71, 156.66, 156.69, 257
IPC ............................................... H02K 3/50, 5/22
See application file for complete search history.

(56) References Cited

U.S. PATENT DOCUMENTS 6,323,569 B1 * 11/2001 Akama .................. H02K 37/14
310/112
2007/0145834 A1 * 6/2007 Usui ....................... H02K 1/145
310/12.01
(Continued)

FOREIGN PATENT DOCUMENTS

JP          61-251462 A      11/1986
JP            5-64411 A       3/1993
(Continued)

OTHER PUBLICATIONS

International Search Report dated Dec. 11, 2012 issued in corresponding application No. PCT/JP2012/073036.

*Primary Examiner* — Thomas Truong
(74) *Attorney, Agent, or Firm* — Westerman, Hattori, Daniels & Adrian, LLP

(57) ABSTRACT

Provided is an outer rotor type motor capable of reducing workload for wiring and connecting coil leads without reducing a coil space factor while keeping the motor small. Coil leads extracted from same-phase coils of respective stator units pass between pole teeth of the stator units, and are respectively connected to inter-phase connection terminals at one end and then connected in series with each other, the stator units comprises a plurality of individual same-phase stator units which are stacked together, and the inter-phase connection terminals are protruded from a main terminal body. A drive signal input terminal and external input terminals, to which the other ends of coil leads extracted from the respective phase coils are respectively connected, and a drive signal input terminal and an external input terminal, to which the other ends of coil leads extracted from the respective phase coils are respectively connected, are respectively connected and wired inside the main terminal body.

3 Claims, 5 Drawing Sheets

(51) Int. Cl.
*H02K 37/10* (2006.01)
*H02K 1/14* (2006.01)
*H02K 3/52* (2006.01)
*H02K 3/46* (2006.01)
*H02K 9/00* (2006.01)
*H02K 5/22* (2006.01)

(56) References Cited

U.S. PATENT DOCUMENTS

2007/0278894 A1* 12/2007 Masaki et al. ........... H02K 3/04
310/257

2011/0057524 A1 3/2011 Andrieux et al.

FOREIGN PATENT DOCUMENTS

| JP | 9-74731 A | 3/1997 |
| JP | 2001-69740 A | 3/2001 |
| JP | 2002-78268 A | 3/2002 |
| JP | 2007-174830 A | 7/2007 |
| JP | 2007-325373 A | 12/2007 |
| JP | 2011-504085 A | 1/2011 |

* cited by examiner

OUTER ROTOR TYPE MOTOR

FIELD OF TECHNOLOGY

The present invention relates to an outer rotor type motor used for vehicles, industrial machines, business equipments, etc.

BACKGROUND OF TECHNOLOGY

In a motor, a rotor having a permanent magnet, which faces pole teeth of stator yokes, is rotated by switching a direction of electric current passing through coils of stator units. The coils are electrically connected to a motor circuit board for controlling the current direction, etc. For example, in an ordinary brushless motor, a magnet wire is wound on a stator iron core in a direction parallel to an axial direction of the stator iron core (a winding direction is perpendicular to the axial direction), and a start end and a terminal end of the coils are extracted in the axial direction and connected to a drive circuit.

In a stator unit of an inner rotor type PM stepping motor, a magnet wire is wound on coil bobbins, which are provided on outer circumferences of pole teeth of stator yokes, and an inner end and an outer end of the magnet wire are extracted to a space outside of the stator, through a winding section of a motor case, and connected to a circuit board (see Patent Document 1).

In another inner rotor type PM stepping motor, large-sized bobbins are used without employing a circuit board, base ends of terminal pins are fixed to the bobbins, a start end and a terminal end of a magnet wire are respectively connected to the terminal pins, and the terminal pins are extended in an axial direction and directly connected to a circuit board at front ends (see Patent Document 2).

In an outer rotor type PM stepping motor, a plurality of bobbins, in each of which through-holes are formed in a flange section and on each of which a coil is formed, are stacked, on core sections of the bobbins, in a state where the through-holes are corresponded to each other, terminal rods are fitted in the through-holes and coil leads, which are extracted into grooves of the outer flange section, are respectively connected to the terminal rods so as to supply electric power (see Patent Document 3).

PRIOR ART DOCUMENT

Patent Document

Patent Document 1: Japanese Laid-open Patent Publication No. P2002-78268
Patent Document 2: Japanese Laid-open Patent Publication No. 5-64411
Patent Document 3: Japanese Laid-open Patent Publication No. 9-74731

DISCLOSURE OF THE INVENTION

Problems to be Solved by the Invention

In comparison with the equal-sized inner rotor type PM stepping motor, the outer rotor type PM stepping motor has a merit of generating a greater torque, but coil leads must be wired inside the motor, so enough space for wiring the coils cannot be created.

In the motor disclosed in the Patent Document 1, the circuit board for supplying electric power is used, so number of parts is increased and the circuit board is arranged in a direction perpendicular to a rotor shaft, therefore the circuit board cannot be employed in the outer rotor type motor.

In the motor disclosed in the Patent Document 2, if an outer diameter of the bobbin is outwardly enlarged, a connection distance between the start end of the coil and the terminal pin and a connection distance between the terminal end of the coil and the terminal pin must be long and the coil leads cannot be wired linearly, so workload must be increased and automatic assembling cannot be suitably performed. Further, the coil leads are extracted in the direction perpendicular to a rotor shaft, so this structure cannot be employed in the outer rotor type motor.

In the motor disclosed in the Patent Document 3, the terminal rods are fitted, in the through-holes of the bobbins, in the direction parallel to the rotor shaft, so the outer rotor type motor must be large in size due to spaces required for press-fitting the terminal rods into the through-holes. Further, connection distances between the terminal rods and the coil leads, which are extracted from the bobbins and extended through the grooves of the flange section, must be long and the coil leads cannot be wired linearly, so it is difficult to automatically assemble the motor.

The present invention has been invented to solve the above described problems, and an object of the present invention is to provide an outer rotor type motor capable of reducing workload for wiring and connecting coil leads without reducing a coil space factor while keeping the motor small.

Means for Solving the Problems

To achieve the object, the present invention has following structures.

The outer rotor type motor comprises: a stator including a plurality of stator units, which are concentrically stacked around a bearing section, each of the stator units having a pair of stator yokes, each of which has comb-shaped pole teeth, and an air-core coil, which is formed by winding a magnet wire and sandwiched between the stator yokes; a rotor shaft being inserted in the bearing section; a rotor including a permanent magnet, which has magnetic poles facing the pole teeth, and a rotor yoke, which is capable of rotating about the rotor shaft; and a drive circuit terminal block, in which a drive signal input terminal of a drive circuit for energizing the coils to drive the motor, inter-phase connection terminals and external input terminals are integrally formed in a main terminal body, coil leads extracted from the same-phase coils of the respective stator units pass between the pole teeth of the stator units, and are respectively connected to inter-phase connection terminals at one end and then connected in series with each other, the stator units includes a plurality of the individual same-phase stator units which are stacked together, the inter-phase connection terminals are protruded from the main terminal body, the drive signal input terminal and the external input terminals, to which the other ends of the coil leads extracted from the respective phase coils are respectively connected, and a drive signal input terminal and an external input terminal, to which the other ends of the coil leads extracted from the respective phase coils are respectively connected, are respectively connected and wired inside the main terminal body.

With the above described structure, the drive circuit terminal block includes the main terminal body, in which the drive signal input terminal of the drive circuit for energizing the coils to drive the motor, the inter-phase connection terminals and the external input terminals are integrally formed, so that a circuit board for wiring the coil leads can be omitted, the coil leads extracted from the coils can be linearly wired and wiring cables in the main terminal body can be omitted. Therefore, the motor can be automatically assembled while keeping the motor small.

Preferably, a lead frame, in which the inter-phase connection terminals, the drive signal input terminal and the external input terminals are connected by a connecting section, is insert-molded in the drive circuit terminal block, and then the connecting section is cut, thereby the terminals protruded from the main terminal body are formed.

With this structure, the main terminal body can be produced by insert-molding the lead frame, further the terminal can be formed by only cutting the connecting section, so that a production cost of the outer rotor type motor can be reduced and mass production thereof can be suitably performed.

Further, the main terminal body may be composed of heat releasing resin (e.g., resin including powder of aluminum nitride, ceramic, etc. as fillers), so that the drive circuit terminal block can be used as a motor mounting plate and a heat radiating plate.

Effects of the Invention

By employing the above described outer rotor type motor, the outer rotor type motor, which is capable of reducing workload for wiring and connecting coil leads without reducing a coil space factor while keeping the motor small, can be provided.

EMBODIMENTS OF THE INVENTION

Preferred embodiments of the present invention will now be described in detail with reference to the accompanying drawings. The motor of the following embodiment is a claw pole type two-phase stepping motor, in which a plurality of stator units are concentrically stacked and each of the stator units has a pair of stator yokes, each of which has comb-shaped pole teeth (claw poles), and an air-core coil, which is sandwiched between the stator yokes.

Figure 1:
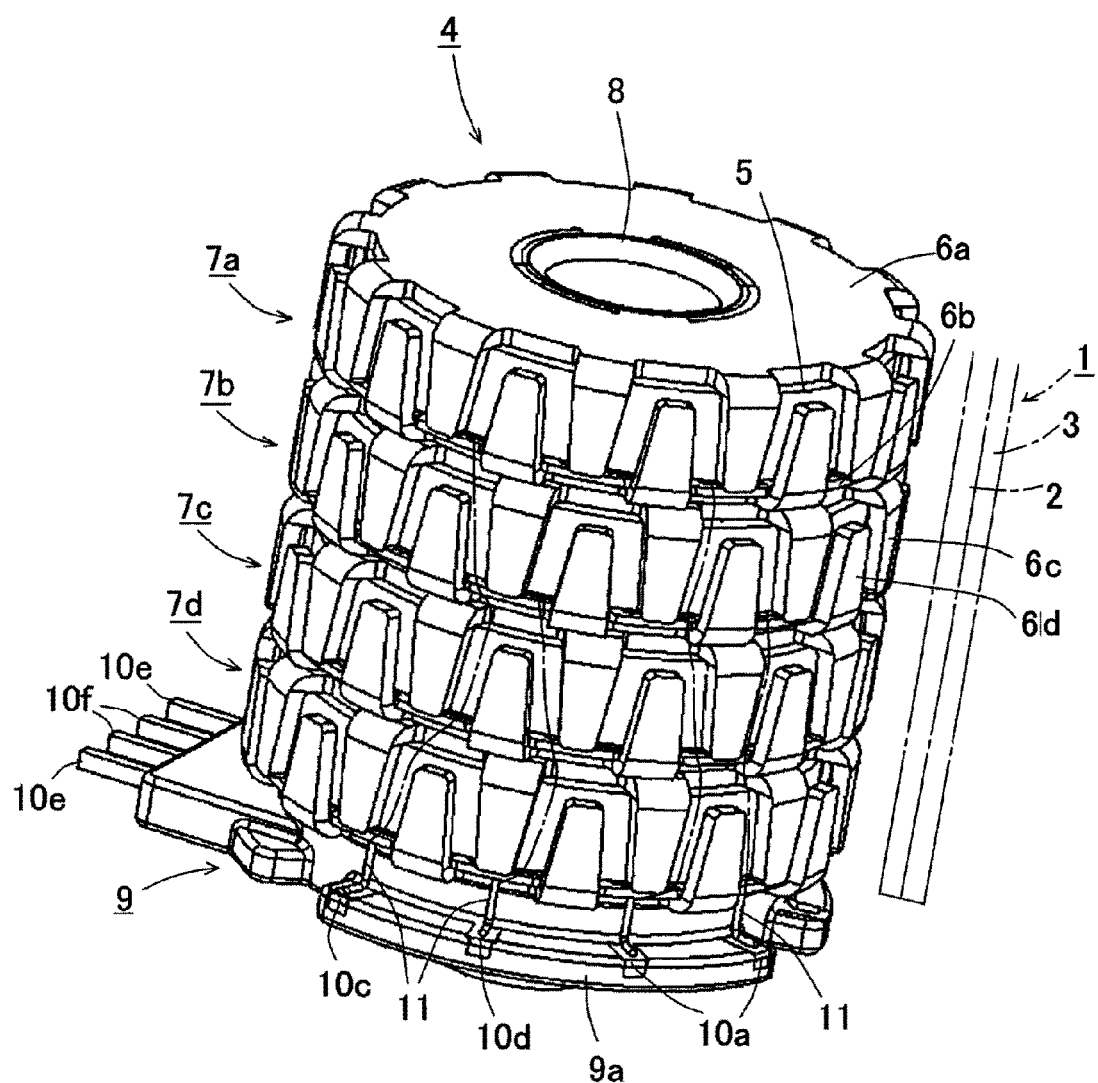
FIG. 1 is a perspective view of a stator.

A schematic structure of the two-phase stepping motor will be explained with reference to FIG. 1. In FIG. 1, a rotor 1 includes a rotor yoke 3, which is formed into a bottomed cylindrical shape, and a permanent magnet 2, which is fixed on an inner circumferential face of the rotor yoke and in which N-poles and S-poles are alternately formed in a circumferential direction. The permanent magnet 2 faces pole teeth (claw poles) of stator yokes described later. In the bottomed rotor yoke 3, a rotor hub is provided to a bottom section, and a rotor shaft is integrated with the rotor hub by press fit, shrinkage fit, etc.

In FIG. 1, a stator 4 includes a plurality of stator units (e.g., four stator units in the present embodiment) 7a-7d, which are concentrically stacked, and each of the stator units includes a pair of stator yokes 6a and 6b and an air-core coil 5, which is formed by winding a magnet wire and sandwiched between the stator yokes. Since the motor of the present embodiment is a two-phase motor, phase difference between A-phase coils and B-phase coils is an electric angle of 180 degrees, and the coils are stacked in order of, for example, "A-A-B-B", "A-B-A-B" or "A-B-B-A". A cylindrical bearing housing 8, through which a rotor shaft will be pierced, is fitted in center holes of the stator units 7a-7d and integrated with a drive circuit terminal block 9. In the bearing housing 8, a cylindrical spacer and a bearing will be concentrically fitted, the rotor shaft will be pierced through a housing hole, and they will be retained by washers. Note that, peripheries of the stator units 7a-7d of the stator 4 may be resin-molded.

In FIG. 1, inter-phase connection terminals 10a and 10b of a drive circuit, which supplies electric power to the A-phase coils and the B-phase coils so as to drive the motor, and drive signal input terminals 10c and 10d and external input terminals 10e and 10f are integrally formed in a main terminal body 9a of the drive circuit terminal block 9.

Concretely, the stator units 7a-7d of the A-phase and the B-phase are divided (e.g., divided into two) and stacked, and coils leads 11 extracted from an inner side of the coil 5 of each of the stator units are connected to the inter-phase connection terminals 10a and 10b, which are protruded from the main terminal body 9a, via a space between pole teeth 6c and 6d located on an outer side of the coil, so that start ends and terminal ends of the stator coils of the same phase (A-phase or B-phase) are respectively connected. The coil leads 11 of each of the phase coils 5 are respectively connected to the drive signal input terminals 10c and 10d. The drive signal input terminal 10c is connected to the external input terminal 10e, and the drive signal input terminal 10d is connected to the external input terminal 10f.

In FIG. 1, if the four stator units are stacked in order of "A-A'-B-B'" from the top, one end (outer end or inner end) of the coil lead 11, which is extracted from the coil 5 (A-phase) of the first stator unit 7a, is connected to the drive signal input terminal 10c, and one end (outer end or inner end) of the coil lead 11, which is extracted from the coil 5 (A'-phase) of the second stator unit 7b, is connected to the drive signal input terminal 10d (see one-dot chain lines shown in FIG. 1). On the other hand, the other end (inner end or outer end) of the coil lead 11, which is extracted from the coil 5 of the first stator unit 7a, is connected to the inter-phase connection terminal 10a, and the other end (inner end or outer end) of the coil lead 11, which is extracted from the coil 5 of the second stator unit 7b, is connected to the inter-phase connection terminal 10a (see one-dot chain lines shown in FIG. 1). The coil leads of the stator units 7c and 7d of the B-phase are also connected in the same manner.

With the above described structure, the inter-phase connection terminals 10a and 10 and the drive signal input terminals 10c and 10d of the drive circuit for driving the motor are integrally formed in the main terminal body 9a of the drive circuit terminal block 9, so that a wiring circuit board can be omitted, the coil leads 11 extracted from each of the coils 5 can be linearly wired and wiring lengths of the coil leads can be shortened. Therefore, the motor can be automatically assembled while keeping the motor small. Further, the drive circuit terminal block 9 may be used as an external mounting plate.

Figure 2:
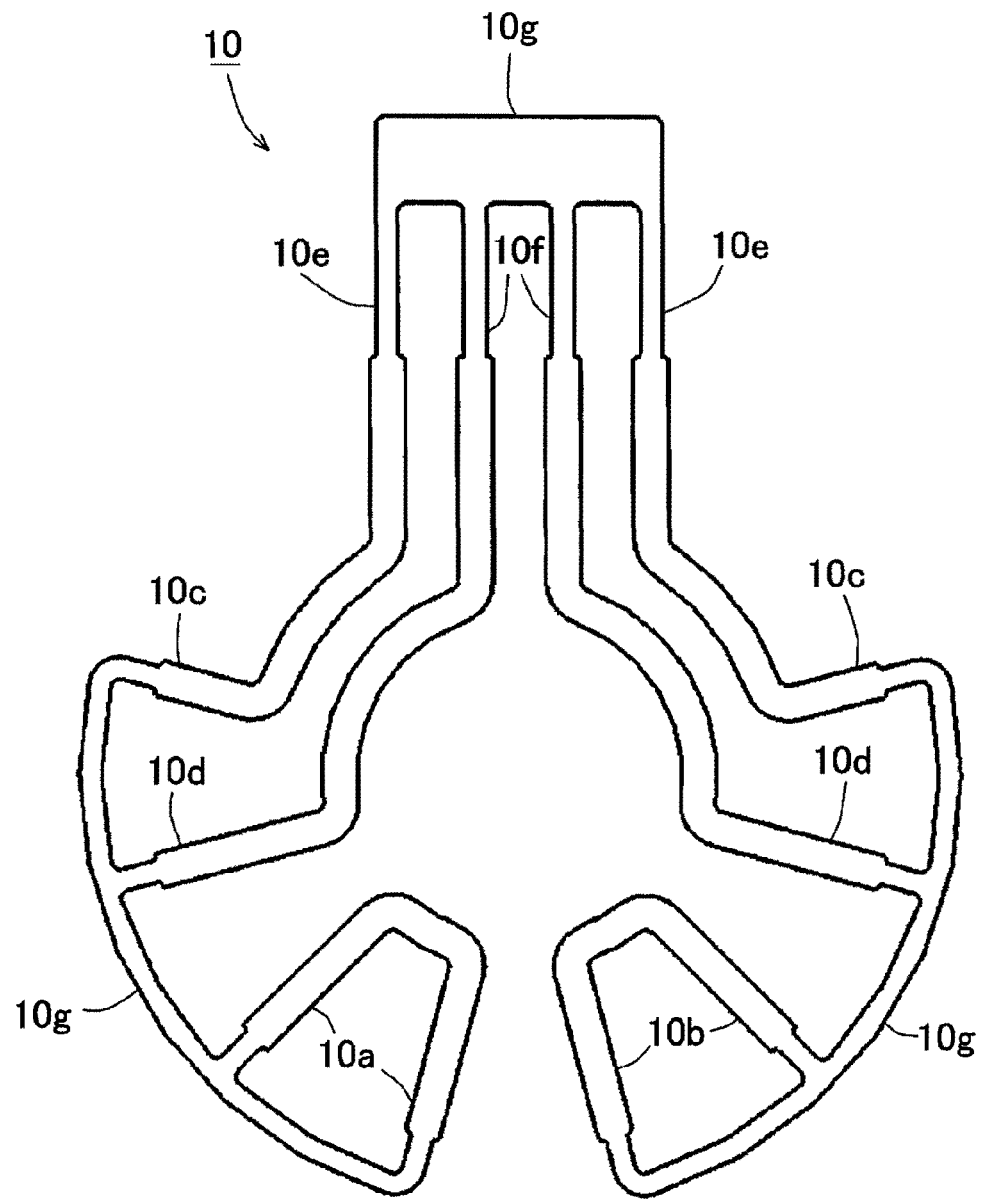
FIG. 2 is a plan view of a lead frame.
Figure 3:
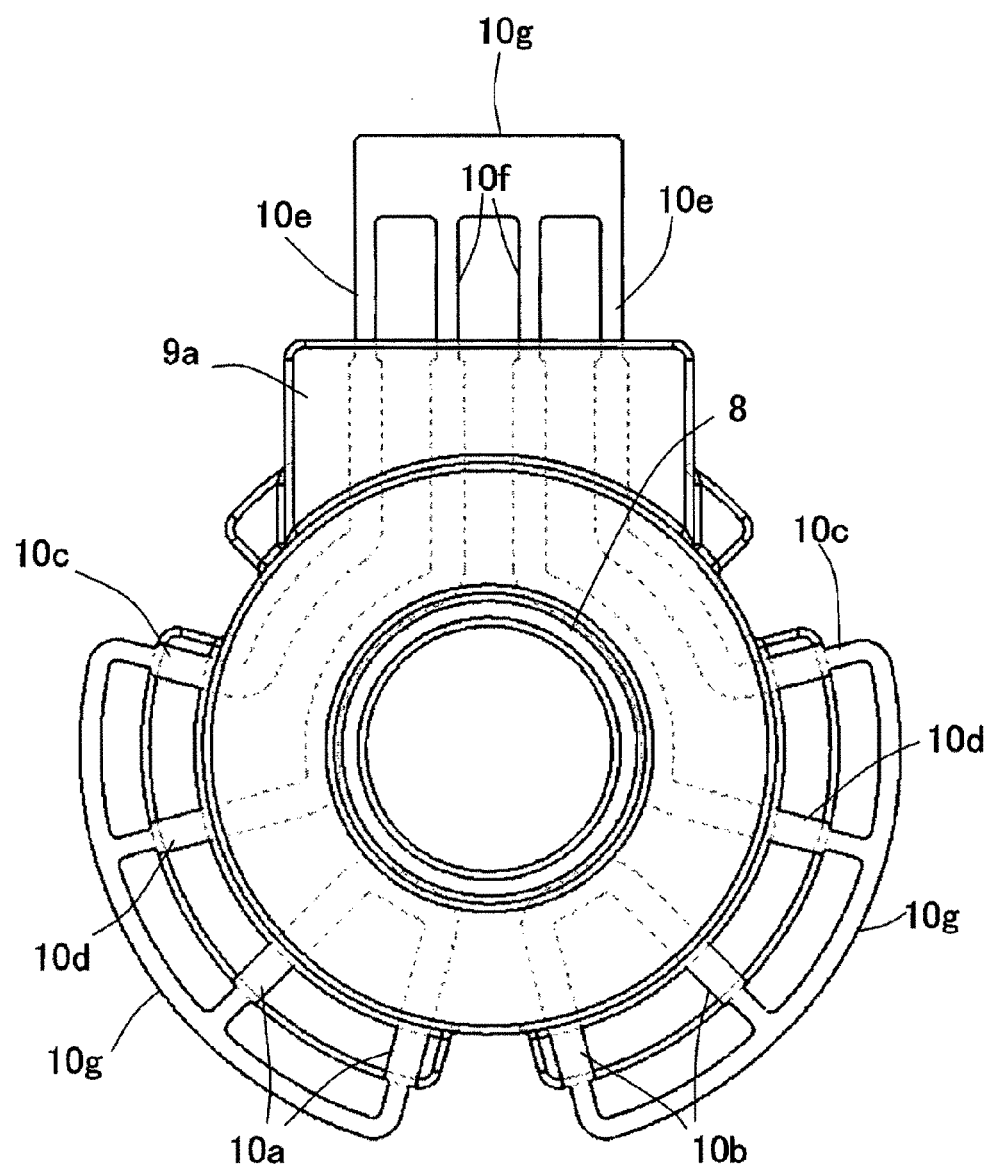
FIG. 3 is a plan view of a molded drive circuit terminal block.

As shown in FIG. 2, the inter-phase connection terminals 10a and 10b, the drive signal input terminals 10c and 10d and the external input terminals 10e and 10f of the drive circuit are formed as a lead frame 10, and the terminals are connected to each other by connecting sections 10g. The main terminal body 9a including the bearing housing 8 is integrally formed, as shown in FIG. 3, by insert-molding the lead frame 10.

Figure 4:
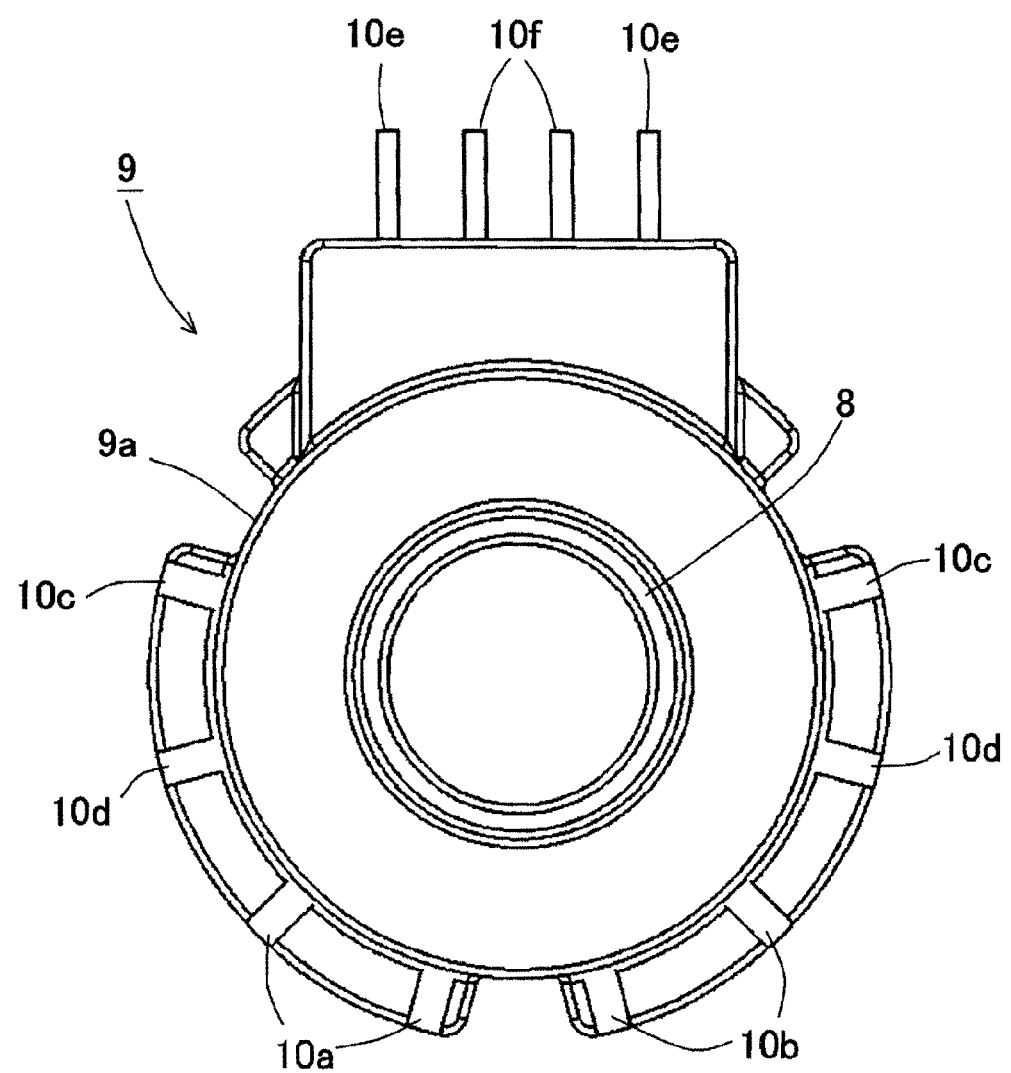
FIG. 4 is a plan view of the molded drive circuit terminal block, in which connecting sections have been cut.

By cutting the connecting sections 10g, the inter-phase connection terminals 10a and 10b, the drive signal input terminals 10c and 10d and the external input terminals 10e and 10f, which are protruded from the main terminal body 9a, are formed as shown in FIG. 4. In the main terminal body 9a, the drive signal input terminal 10c and the external input terminal 10e are connected, and the drive signal input terminal 10d and the external input terminal 10f are connected. Further, the inter-phase connection terminals 10a and 10a (e.g., for A-A' connection) are mutually connected, and the inter-phase connection terminals 10b and 10b (e.g., for B-B' connection) are mutually connected.

With the above described structure, the drive circuit terminal block 9 can be formed by insert-molding the lead frame 10, and the terminals to be connected to the coil leads 11 can be formed by only cutting the connecting sections 10g, so that a production cost of the outer rotor type motor can be reduced and mass production can be realized.

In case that heat releasing resin (e.g., resin including powder of aluminum nitride, ceramic, etc. as fillers) is used as the resin for forming the main terminal body 9a, the drive circuit terminal block 9 can be used as a motor mounting plate and a heat radiating plate.

Figure 5:
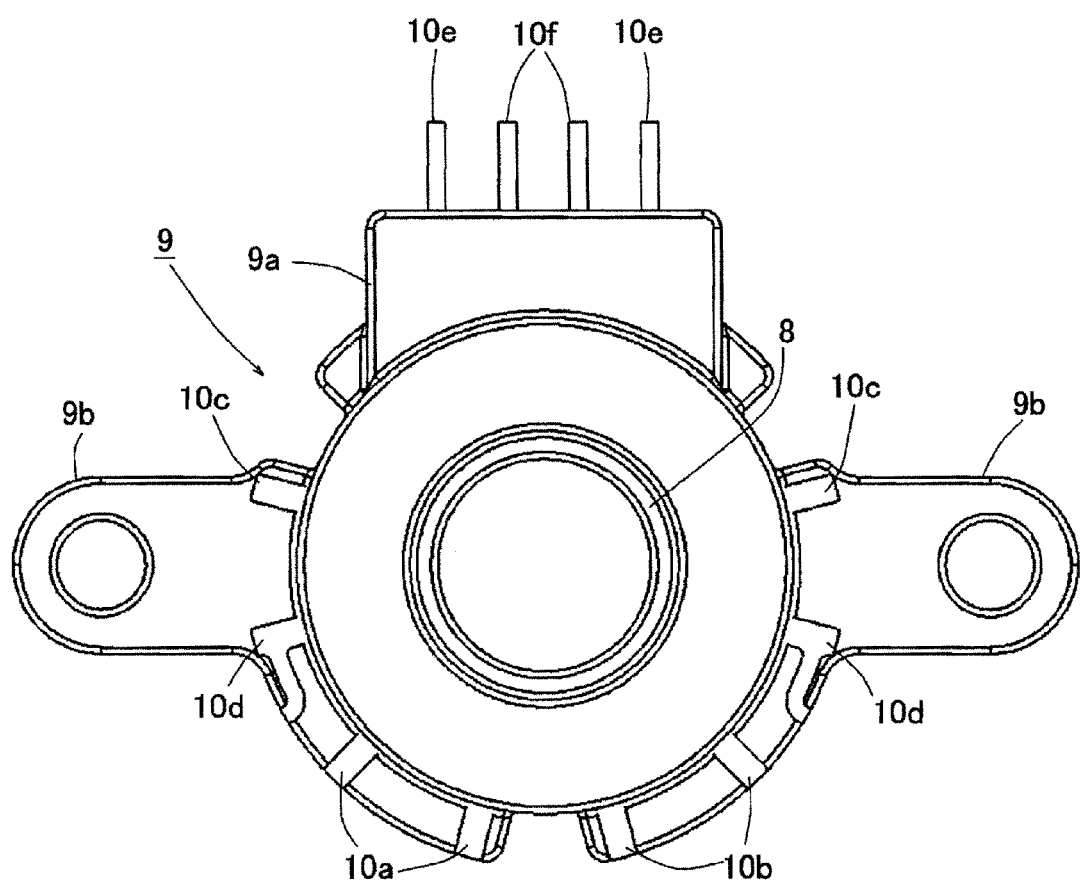
FIG. 5 is a plan view of another example of the drive circuit terminal block.

Further, as shown in FIG. 5, flange sections 9a may be formed in the main terminal body 9a. With this structure, in case that the main terminal body 9a is used as the motor mounting plate, holes of the flange sections can be used for mounting the motor.

In the above described outer rotor type motor, the coil leads can be efficiently wired between small spaces between the stator units 7a-7d without reducing a coil space factor and reliability of insulation between the coils and the drive circuit terminal block 9.

Further, the coil leads 11, which are extracted from the inner side of the coil of each stator unit, can be linearly wired until reaching the terminals of the drive circuit terminal block 9 via a space between the outer periphery of the adjacent coil and the pole teeth, so that the coil leads 11 can be very easily wired and assembling efficiency of the motor can be improved.

Note that, the coil leads 11 of the A-phase or B-phase may be connected to the inter-phase connection terminals 10a and 10b, and positions of the drive signal input terminals 10c and 10d and the external input terminals 10e and 10f may be switched.

In the above described embodiment, the outer rotor type motor is the claw pole type two-phase stepping motor, but the present invention is not limited to the embodiment, and the present invention may be applied to a multiphase stepping (brushless) motor, e.g., three-phase, four-phase, . . . n-phase motor, which has a long axial length but restrains vibration.

What is claimed is:

1. An outer rotor type motor, comprising: a stator including a plurality of stator units, which are concentrically stacked around a bearing section, each of the stator units having a pair of stator yokes, each of which has comb-shaped pole teeth, and an air-core coil, which is formed by winding a magnet wire and sandwiched between the stator yokes; a rotor shaft being inserted in the bearing section; a rotor including a permanent magnet, which has magnetic poles facing the pole teeth, and a rotor yoke, which is capable of rotating about the rotor shaft; and a drive circuit terminal block, in which a drive signal input terminal of a drive circuit for energizing the coils to drive the motor, inter-phase connection terminals and external input terminals are integrally formed in a main terminal body, wherein coil leads extracted from the same-phase coils of the respective stator units pass between the pole teeth of the stator units, and are respectively connected to inter-phase connection terminals at one end and then connected in series with each other, the stator units includes a plurality of the individual same-phase stator units which are stacked together, the inter-phase connection terminals are protruded from the main terminal body, the drive signal input terminal and the external input terminals, to which the other ends of the coil leads extracted from the respective phase coils are respectively connected, and a drive signal input terminal and an external input terminal, to which the other ends of the coil leads extracted from the respective phase coils are respectively connected, are respectively connected and wired inside the main terminal body.

2. The outer rotor type motor according to claim 1, wherein a lead frame, in which the inter-phase connection terminals, the drive signal input terminal and the external input terminals are connected by a connecting section, is insert-molded in the drive circuit terminal block, and then the connecting section is cut, thereby the terminals protruded from the main terminal body are formed.

3. The outer rotor type motor according to claim 1, wherein the main terminal body is composed of heat releasing resin.

* * * * *